(12) United States Patent
Edge et al.

(10) Patent No.: US 7,120,295 B2
(45) Date of Patent: Oct. 10, 2006

(54) COLOR PROCESSING

(75) Inventors: Christopher J. Edge, Saint Paul, MN (US); William A. Rozzi, Stillwater, MN (US); Timothy A. Fischer, Mendota Heights, MN (US)

(73) Assignee: Eastman Kodak Company, Rochester, NY (US)

( * ) Notice: Subject to any disclaimer, the term of this patent is extended or adjusted under 35 U.S.C. 154(b) by 441 days.

(21) Appl. No.: 10/612,734

(22) Filed: Jul. 2, 2003

(65) Prior Publication Data

US 2004/0218811 A1 Nov. 4, 2004

Related U.S. Application Data

(62) Division of application No. 09/259,579, filed on Mar. 1, 1999, now Pat. No. 6,608,925.

(51) Int. Cl.
*G06K 9/00* (2006.01)

(52) U.S. Cl. .................. 382/162; 382/167; 358/1.9

(58) Field of Classification Search ................ 382/162, 382/167; 358/1.9, 1.1, 500–530; 345/589–604
See application file for complete search history.

(56) References Cited

U.S. PATENT DOCUMENTS

| | | | |
|---|---|---|---|
| 4,500,919 A | 2/1985 | Schreiber | |
| 4,992,963 A | 2/1991 | Funt et al. | |
| 5,668,890 A | 9/1997 | Winkelman | |
| 5,754,448 A | 5/1998 | Edge et al. | |
| 5,786,823 A | 7/1998 | Madden et al. | |
| 5,956,044 A | 9/1999 | Giorgianni et al. | |
| 6,108,442 A * | 8/2000 | Edge et al. | 382/167 |
| 6,362,808 B1 * | 3/2002 | Edge et al. | 345/601 |
| 6,373,531 B1 | 4/2002 | Hidaka et al. | |
| 6,480,299 B1 * | 11/2002 | Drakopoulos et al. | 358/1.9 |
| 6,608,925 B1 | 8/2003 | Edge et al. | |

FOREIGN PATENT DOCUMENTS

| | | |
|---|---|---|
| EP | 0753725 A2 | 1/1997 |
| EP | 0948194 A2 | 10/1999 |

OTHER PUBLICATIONS

Granger, Edward Dr., "A New Color Space for Image Appearance Equivalence," LightSource, Inc., Seybold Seminars 1992, Abridged Conference Publishing, pp. 47-48.
Seybold, Jonathan et al., "Color and Imaging," Seybold Seminars 1992, Abridged Conference Proceedings, pp. 33-36.
International Color Profile Format; version 3.0, Jun. 10, 1994.
Wyszecki, Gunter et al., "Color Science, Concepts and Methods, Quantitative Data and Formulae," 2nd Edition, John Wiley and Sons.
Stone, Maureen C. et al., "Color Gamut Mapping and the Printing of Digital Color Images," ACM Transactions on Graphics, vol. 7, No. 4, Oct. 1988, pp. 249-292.

(Continued)

*Primary Examiner*—Sherali Ishrat
(74) *Attorney, Agent, or Firm*—Mark G. Bocchetti

(57) ABSTRACT

A method of characterizing a color imaging system is provided. The method comprises obtaining first data indicative of output of the color imaging system. The first data is processed, to yield second data, according to a color appearance model that varies in accordance with neutrality of colors indicated by the first data. Other methods are provided as well as systems and computer program products for characterizing color imaging systems and devices and for producing colors.

20 Claims, 5 Drawing Sheets

OTHER PUBLICATIONS

R.W.G. Hunt, "Revised Colour-Appearance Model for Related and Unrelated Colours," John Wiley & Sons, Inc., 1991, pp. 146-165.

Fairchild, Mark D. et al., "Image Color-Appearance Specification Through Extension of CIELAB," John Wiley & Sons, Inc., 1993, pp. 178-190.

Fairchild, Mark D., "Visual Evaluation and Evolution of the RLAB Color Space," Munsell Color Science Laboratory, Center for Imaging Science Rochester Institute of Technology Rochester, New York, 1994.

Pointer, Michael R., "A Color Reproduction Index," 1994.

* cited by examiner

USE OF LOCAL WHITE POINT $C_{LW}$ AND COMMON WHITE POINT $C_{CW}$, FOR DETERMINING Y-REFERENCE AND WHITE REFERENCE VECTOR, IN RELATION TO NORMALIZED ORIGINAL COLOR DATA TRISTIMULUS VALUES $X_{norm}$, $Y_{norm}$, AND $Z_{norm}$.

COLOR PROCESSING

This application is a divisional application of U.S. application Ser. No. 09/259,579, filed Mar. 1, 1999 now U.S. Pat. No. 6,608,925.

BACKGROUND OF THE INVENTION

The invention relates generally to color processing and, more particularly, to techniques for color characterization and transformation.

Since the introduction of the CIE (Commission International de l'Eclairage) color measurement system in the early 1930's, many different color spaces have been proposed for different applications. A color space, also referred to as a color "metric," is essentially a coordinate system by which a color can be quantified.

A color space can be used to characterize the color output of a color imaging system relative to other color imaging systems. By characterizing multiple color imaging systems, the color space facilitates using different imaging systems to produce matching colors. An "ideal" color space would calculate a color mapping between different color imaging systems that achieves an acceptable color match between the systems without subjective or empirical adjustment.

Color spaces differ in the parameters expressed on their coordinate axes and the manner in which the parameters are calculated. CIE color spaces use CIE Standard Observer functions that are based on color matching functions and result in a unique set of tristimulus values XYZ for any color measured under specified conditions. The tristimulus values XYZ are calculated from the spectral output of either an additive or subtractive color system convoluted with the response function of either a 2 degree or 10 degree Standard Observer. In the case of reflective hard copy, the spectral reflectance curve is typically convoluted with a standard illuminant to estimate the expected spectral output of the reflective color.

One CIE color space is the CIELAB color space. In this color space, L* represents lightness, a* represents redness-greenness, and b* represents yellowness-blueness. The CIELAB color space employs a modified von Kries chromatic adaptation algorithm. According to the modified von Kries chromatic-adaptation transform, a description of which can be found in Gunter Wyszecki and W. S. Stiles, Color Science: Concepts and Methods, Quantitative Data and Formulae, section 5.12, John Wiley & Sons, Inc., 1982, the L*a*b* color spaces make use of white reference tristimulus data. The modified von Kries chromatic-adaptation transform involves dividing the tristimulus values XYZ obtained for a color produced by a particular color imaging system by white reference tristimulus values for the system. For example, the X, Y, and Z tristimulus values of the color under study can be divided, respectively, by the X, Y, and Z tristimulus values for a perfectly diffuse white reflector. Thus the von Kries approach defines both neutral and chromatic colors relative to the "white reference" representing the XYZ tristimulus values of the perfectly diffuse white reflector. The equations for the CIE 1976 CIELAB color space are as follows:

$$L^* = 116 \times f(Y/Y_n) - 16 \qquad [1]$$

$$a^* = 500 \times [f(X/X_n) - f(Y/Y_n)] \qquad [2]$$

$$b^* = 200 \times [f(Y/Y_n) - f(Z/Z_n)] \qquad [3]$$

$$f(\omega) = (\omega)^{1/3} \quad \omega > 0.008856 \qquad [4]$$

$$f(\omega) = 7.787(\omega) + 16/116 \quad \omega \leq 0.008856 \qquad [5]$$

where $X_n$, $Y_n$, and $Z_n$ are the tristimulus values of a perfectly diffuse white reflector under specified viewing conditions. The viewing conditions are determined by (1) the illuminant, e.g., $D_{50}$, and (2) the Standard Observer (2° or 10°).

SUMMARY OF THE INVENTION

In general, in one aspect, the invention provides a method of characterizing a color imaging system. The method comprises obtaining first data indicative of output of the color imaging system. The first data is processed, to yield second data, according to a color appearance model that varies in accordance with neutrality of colors indicated by the first data.

In general, in another aspect, the invention provides a computer program product residing on a computer readable medium, for characterizing a color imaging system, and comprising instructions. The instructions are for causing a computer to obtain first data indicative of output of the color imaging system and to process the first data, to yield second data, according to a color appearance model that varies in accordance with neutrality of a color indicated by the first data.

In general, in another aspect, the invention provides a method of producing a color on a device. The method comprises obtaining first data associated with a first device and indicative of a first color. Second data are determined that are related to stimulus data of the first device by a color appearance model that converts input data to output data using a white reference vector that varies in association with a neutrality of a color indicated by the input data. A second device is actuated according to the second data to produce a second color to approximate the first color.

In general, in another aspect, the invention provides a computer program product residing on a computer readable medium, for producing a color on a device, and comprising instructions. The instructions are for causing a computer to obtain first data associated with a first device and indicative of a first color. The instructions are also for causing the computer to determine second data related to stimulus data of the first device by a color appearance model that converts input data to output data using a white reference vector that varies in association with a neutrality of a color indicated by the input data. The instructions are also for causing the computer to actuate a second device according to the second data to produce a second color to approximate the first color.

In general, in another aspect, the invention provides a method of producing a color with an emissive device using absolute colorimetry. The method comprises obtaining first data indicative of a first color. Second data are determined that are related to the first data by a color appearance model that uses a white point of the emissive device as a white reference vector. The emissive device is actuated according to the second data to implement absolute colorimetry to produce a second color to approximate the first color.

In general, in another aspect, the invention provides a computer program product residing on a computer readable medium, for producing a color with an emissive device using absolute colorimetry, and comprising instructions. The instructions are for causing a computer to obtain first data indicative of a first color and to determine second data related to the first data by a color appearance model that uses a white point of the emissive device as a white reference vector. The instructions are also for causing the computer to actuate the emissive device according to the second data to implement absolute colorimetry to produce a second color to approximate the first color.

In general, in another aspect, the invention provides a method of characterizing an emissive device for absolute colorimetry. The method comprises obtaining first data indicative of output of the emissive device. The first data are converted to second data using a color appearance model that uses a white point of the emissive device as a reference white vector. The second data are provided for use in absolute colorimetric color reproduction.

In general, in another aspect, the invention provides a computer program product residing on a computer readable medium, for characterizing an emissive device for absolute calorimetry, and comprising instructions. The instructions are for causing a computer to obtain first data indicative of output of the emissive device and to convert the first data to second data using a color space that uses a white point of the emissive device as a reference white vector. The instructions are also for causing the computer to provide the second data for use in absolute colorimetric color reproduction.

In general, in another aspect, the invention provides a method of characterizing colors for reproduction between a first device and a second device. The method includes normalizing first tristimulus values indicative of a color of the first device using local black point values. The normalized first tristimulus values are transformed to obtain color values indicative of modified cone responses of the human eye. The color values are chromatically adapted from a local condition to a reference condition. The adapted color values are transformed to obtain second tristimulus values.

Embodiments of the invention may provide one or more of the following advantages. The invention provides more accurate color characterization over the entire range of a color imaging system than color characterization using a fixed white reference point. The helps ensure substantial uniformity of the color characterization for both light color shades and more intense colors, and for neutral and non-neutral colors. Emissive devices can be caused to display colors, both saturated and neutral, that match well to corresponding colors on absorptive devices.

Other advantages will be apparent from the following description and from the claims.

DESCRIPTION OF PREFERRED
EMBODIMENTS

The invention provides methods and systems for characterizing color to accurately reproduce the color from one medium or color system to another where the two systems have different illuminant and/or media white points.

Figure 1:
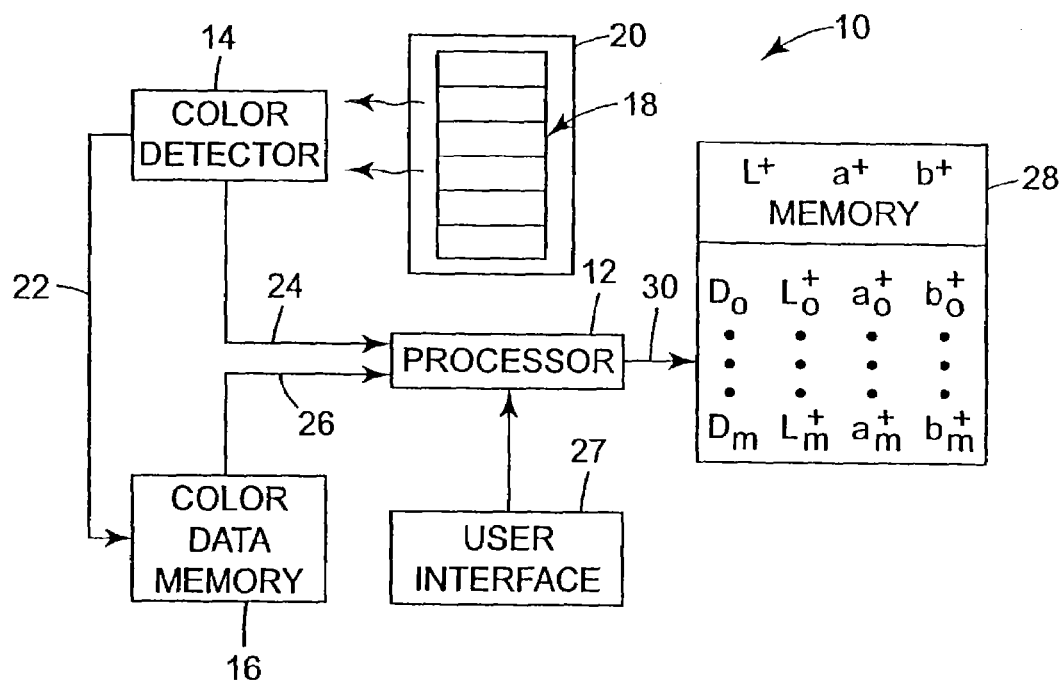
FIG. 1 is a block diagram of a system, in accordance with the invention, for characterizing a color imaging system.

As shown in FIG. 1, a system 10 for characterizing a color imaging system includes a processor 12, a color detector 14, a color data memory 16, a substrate 20, and a L*a*b* memory 28. Characterizing, also commonly referred to as "profiling," can be used to analyze a single color imaging system, or as a basis to transform the color response of a "source" color imaging system to match the color response of a "target" color imaging system. The color response of a color imaging system is the correlation between a range of input color values (i.e., device stimulus data) and measured colors. The measured colors are produced according to the input values for color-producing systems such as displays or printers, and are the colors measured by color-measuring systems such as scanners. The device stimulus data can be, e.g., RGB or CMYK values. The stimulus data span ranges of discrete values of the system. For example, for an emissive RGB device, the values of R, G, and B can each range from 0 to m in increments of 1, where typically m=255. Stated differently [R,G,B]=[i,j,k] where i, j, k=0→m, where typically m=255. The output colors are produced according to output values produced from the input device stimulus data. A method for characterizing a color imaging system using the system 10 will be described in terms of the functionality of system 10.

The processor 12 executes a software application program configured, to carry out the method for characterizing a color imaging system. The software can be, e.g., in the C++ programming language. The processor 12 can be realized, for example, by a personal computer such as an Apple Macintosh™ or an IBM PC, or by a computer workstation. Alternatively, processor 12 could be realized by a microprocessor that accesses a read-only memory (ROM) into which the application program is loaded. The application program could be embedded in a color management software package, such as that provided with the Imation Corporation Rainbows™ color proofing system, commercially available from Imation Corp., of Oakdale, Minn. The implementation of system 10 and the method using software affords flexibility in development and modification. The system 10 and method alternatively can be implemented by an integrated logic circuit for increased color processing speed.

The color detector 14 and the color data memory 16 allow the system 10 to obtain color data representing the output of various color imaging systems. The color data can be obtained directly from a color imaging system via the color detector 14, or by accessing a color data file stored in the color data memory 16. The color detector 14 and the memory 16 can help characterize, e.g., color printing systems, color display systems, color projection systems, and color-measuring systems. For use with a printing system, for example, color detector 14 is configured to measure color values of color patches 18 formed on the printing substrate 20. For use with a color display, color detector 14 is configured to measure color values produced on a phosphor screen or liquid crystal matrix. For use with a color projection system, color detector 14 is equipped to measure color values of projected colors. For use with a color-measuring system, color detector 14 is configured to measure color valves measured by the color-measuring system. As one illustration, color detector 14 could be configured to capture a scene or an animated sequence from a display or projection system, and generate color values representative of the captured imagery.

The implementation of the color detector 14 depends on the application. The color detector 14 can be, for example, a color measurement system such as a Gretag™ SPM 50 color measurement device, commercially available from Gretag, Inc., of Regensdorf, Switzerland, or a densitometer, such as an X-Rite color densitometer, commercially available from X-Rite, of Grandville, Mich. For display or protection system applications, color detector 14 can be a video camera or digital camera.

The color detector 14 can store detected data in the color data memory 16 or in the processor 12. The color data obtained by color detector 14 can be loaded into color data memory 16 as a color data file, as indicated by line 22. Alternatively, the color data obtained by color detector 14 can be directly loaded into a memory (not shown) associated with processor 12, as indicated by line 24.

The processor 12 can access its own memory or the color data file stored in color data memory 16, as indicated by line 26, to obtain original color data previously detected by color detector 14. The color data memory 16 can store several color data files for a variety of different color imaging systems. Thus, a system user can direct processor 12, via a user interface 27 (e.g., a keyboard, a mouse, or a touch-sensitive screen), to select one of the various color data files for purposes of characterizing a particular color imaging system of interest to the system user.

The color data obtained from either color detector 14 or color data memory 16 preferably represents CIE XYZ tristimulus values for each of a variety of color outputs generated by a color imaging system under study. Alternatively, the color data can be converted to CIE XYZ tristimulus values. The CIE XYZ tristimulus values represent the relative amounts of primary color stimuli required to match colors within a CIE color system. The relative values of XYZ are influenced by the power distribution of the illuminant, e.g., $D_{50}$, and the CIE Standard Observer function, e.g., 2° or 10°. As an alternative to CIE XYZ, the color data can be, for example, in the form of RGB data, CMYK density data, or other device dependent data. In addition, the color data preferably represents color outputs distributed across the color gamut of the color imaging system to provide a broad sampling for purposes of color characterization. Thus, in the case of a printing system, color patches 18 represent various combinations and gradations of colors formed by dye transfer or ink deposition.

It was found that as colors, such as those of patches 18, on a source device varied from light to dark, and from neutral to saturated, the mismatch of colors produced on a destination device intended to match the source device colors also varied. Thus, even if light or neutral source device colors were reproduced on the destination device that matched well with the source device colors, dark or saturated colors did not match well, and vice versa. It was determined that in order to improve the match of both light and dark colors, and neutral and saturated colors, the color appearance model(s) used to convert the source device colors to destination device colors should vary with intensity and neutrality. The invention provides such a varying color appearance model.

To characterize the color imaging system, processor 12 converts the original color data using a color appearance model that uses a Y-reference and a white reference vector that depend on the intensities and neutralities of the original color data. In particular, the processor 12 varies the conversion of a Y value of the original color data to a luminance descriptor according the Y-reference value. The Y-reference value depends on the Y value of the original color data. The processor 12 varies the conversion of the original color data to two chrominance descriptors by determining a white reference vector according to the neutralities of colors indicated by the tristimulus values. The term "white reference vector" refers to a vector of tristimulus values $X_r$, $Y_r$, $Z_r$ that describe a color used as a white reference.

Figure 2:
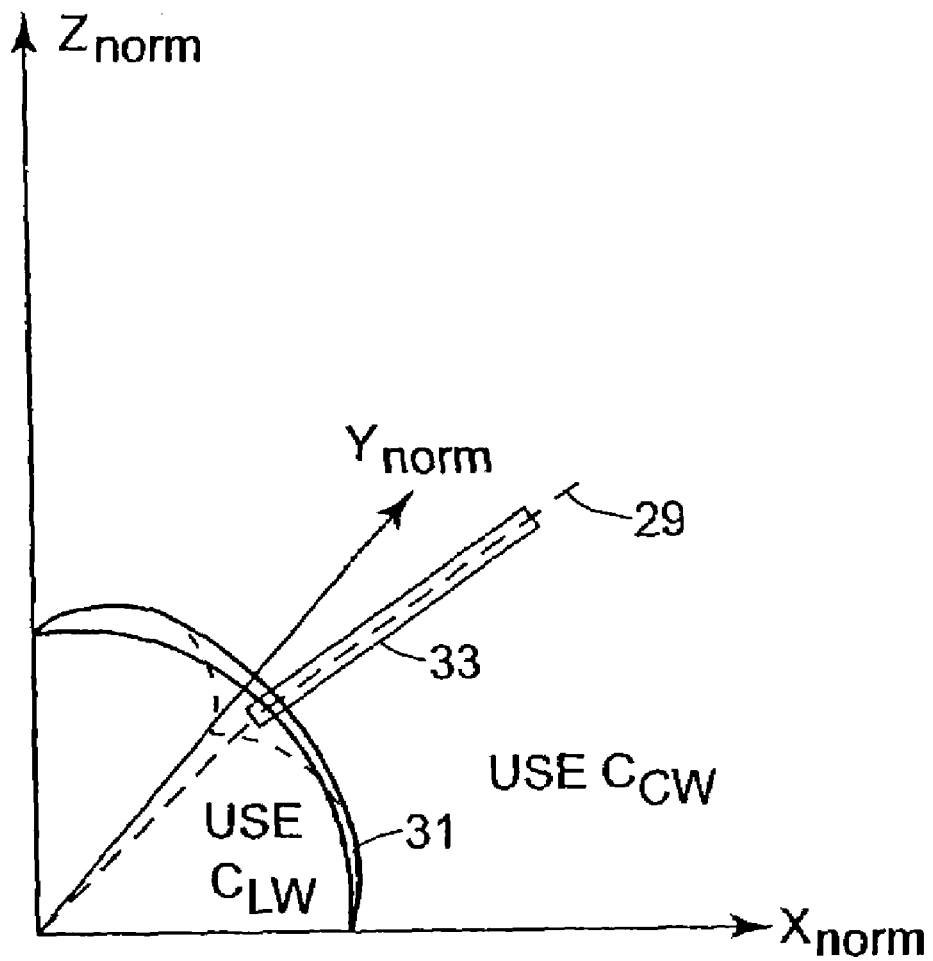
FIG. 2 is a schematic diagram of the use of local and common white references depending on colors indicated by a color imaging system.

The values of the Y-reference and the white reference vector are determined according to values of a "local white point" $C_{LW}$ and a "common white point" $C_{CW}$. The local white point $C_{LW}$ and the common white point $C_{CW}$ are both vectors, with $C_{LW}=(X_{LW}, Y_{LW}, Z_{LW})$ and $C_{CW}=(X_{CW}, Y_{CW}, Z_{CW})$. As shown in FIG. 2, for determining the Y-reference and the white reference vector, values of the local white point $C_{LW}$ are used when the original color data indicates a near-neutral color and values of the common white point $C_{CW}$ are used when the original color data indicates a non-neutral, i.e., saturated, color. Line 29, where proportions of $X_{norm}$, $Y_{norm}$, and $Z_{norm}$ are equal, indicates neutral colors. The quantities $X_{norm}$, $Y_{norm}$, and $Z_{norm}$ are the original color data normalized by reference white values such as from a perfectly white diffuser under standard viewing conditions. As shown by spherical surface 31 and tube 33 for purposes of illustration, there is an abrupt change between use of the local white point $C_{LW}$ and the common white point $C_{LW}$. Preferably, the transition between use of the two white points is gradual, and not as abrupt as shown.

The values of the vectors $C_{LW}$ and $C_{CW}$ depend on whether the device under consideration is absorptive (e.g., paper) or emissive (e.g., a monitor), and whether relative colorimetric intent or absolute colorimetric intent is selected, e.g., through the user interface 27. Depending on these factors, the local white point $C_{LW}$ and the common white point $C_{CW}$ are equal to "media white," or "illuminant white," or a predetermined white that may be independent of the color imaging system under consideration. Media white for an absorptive medium is the white point of the absorptive substrate under a chosen illuminant. For an emissive device, media white is the whitest color that the device produces. Illuminant white is the color reflected by a perfectly diffuse white reflector illuminated by a selected illuminant.

TABLES 1–4 illustrate the values of the local white point $C_{LW}$ and the common white point $C_{CW}$ for relative and absolute colorimetric intent for producing images using various combinations of absorptive and emissive media. As shown in TABLE 2, the local white point $C_{LW}$ for absolute colorimetry for two absorptive devices using different illuminants is the illuminant white corresponding to the illuminant used with each device. Also, the common white point $C_{CW}$ for the case shown in TABLE 2 is the illuminant white of either medium, or another illuminant white, as long as the same white point is used for both media. As shown in TABLE 4, when two emissive devices are used the local white point for absolute colorimetry is the media white for each device. For two emissive devices the common white point shown in TABLE 4 can be a predetermined illuminant white, which may correspond to the media white of either emissive device.

The local white point $C_{LW}$ for an emissive device using absolute colorimetric intent is the media white of the emissive device. Thus, as shown in TABLE 4, absolute colorimetric intent using two emissive devices merges with relative colorimetric intent because the media white point is used as the local white point for both rendering intents. It was discovered that when attempting to reproduce a color from an absorptive device on an emissive device using absolute colorimetry, the monitor produced a dark, overly-yellow color. It was found that the human eye adjusts to define the media white of an emissive device as being white. By using the media white of the emissive device for the local white point $C_{LW}$ for absolute colorimetry, it was found that the emissive device can provide a good reproduction of the media white c_the absorptive device and can provide good grey balance. The invention accounts for this finding by using the media white point for the local white point $C_{LW}$ for absolute colorimetric intent using emissive devices, thereby improving color match compared to prior techniques.

Processor 12 is adapted to alter the color appearance model dependent on the neutralities and intensities indicated by the original color data to produce a modified L*a*b* color space, an L*a*b* color space. Processor 12 can store the L*a*b* color data in an L*a*b* memory 28, as indicated by line 30, in association with corresponding device stimulus data D. The L*a*b* color data based on color intensity and neutrality allow system 10 to achieve accurate color characterization over the entire range of a color imaging system. In particular, these data help ensure that system 10 can achieve substantial uniformity of the color characterization between light color shades and more intense colors, and between neutral and non-neutral colors.

Figure 3:
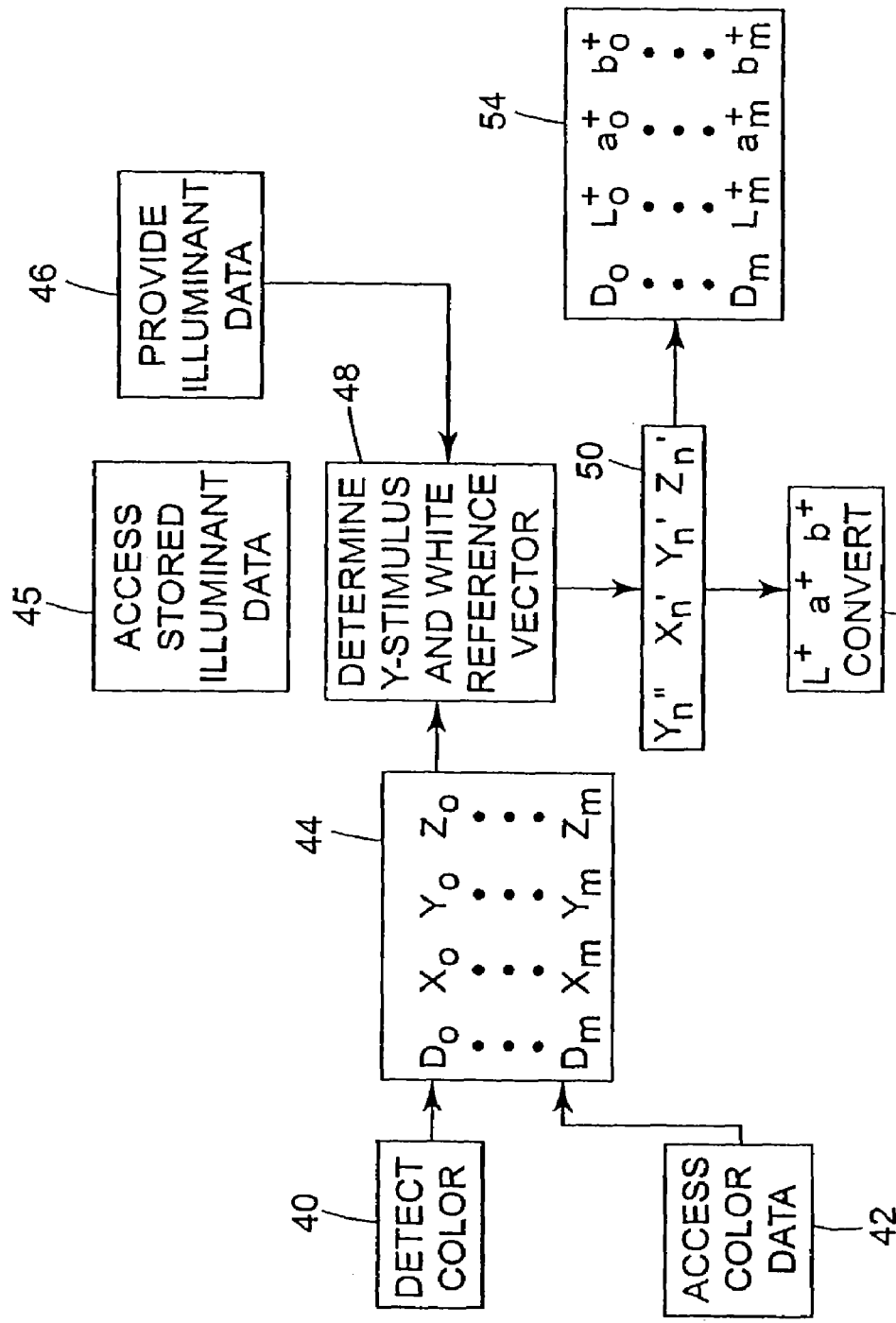
FIG. 3 is a functional block diagram of the system shown in FIG. 1.

Referring to FIGS. 1 and 3, the functionality of system 10 is shown. The processor 12 can convert the original color data obtained from either color detector 14 or color data memory 16 to converted color data. To do so, the processor 12 uses any of the existing color appearance models, such as CIELAB, CIECAM-97s, RLAB, etc., subject to determination dependent on the intensities and neutralities of colors indicated by the original color data. The CIELAB color appearance model will be used in the following description for purposes of illustration.

Color data are obtained for a particular color imaging system by either detecting color data produced by the color imaging system, as indicated by block 40, or accessing color data in a color data file, as indicated by block 42. The color data have corresponding device stimulus data D used to actuate the color imaging system to produce a color corresponding to the color data for color-producing systems, and determined by measuring colors for color-measuring systems. The data indicated by block 44 comprise an array of device stimulus data $D_0-D_m$ and CIE XYZ data $[(X_0, Y_0, Z_0) \ldots (X_m, Y_m, Z_m)]$.

The local white point $C_{LW}$ and the common white point $C_{CW}$ are also obtained. As indicated by TABLES 1–4, depending on the color imaging devices involved and the colorimetric intent desired, one or more media white points and one or more illuminant white points are needed. The media white point(s) is(are) obtained from the data in block 44. The illuminant white reference vector(s) is(are) obtained either by accessing a data file, as indicated by block 45, or by being provided as indicated by block 46 from an appropriate device, e.g., the processor 12, the color detector 14, or the user interface 27. These illuminant white reference vectors correspond to the illuminant white points indicated in TABLES 1–4 and discussed above. These vectors correspond to the illuminant white of, e.g., the illuminant under which colors were viewed to produce the data array in block 44, or another similar block of data, or a predetermined illuminant white point.

The color data indicated by block 44 are used to determine a white reference vector $(X_r', Y_r', Z_r')$ and a Y-reference $Y_r''$ in relation to the local white point and the common white point, as indicated by block 48. The white reference vector $(X_r', Y_r', Z_r')$ and the Y-reference $Y_r''$ are determined for each set of color data shown in block 44 according to the intensity and neutrality of the color indicated by the color data. The white reference vector $(X_r', Y_r', Z_r')$ and Y-reference $Y_r''$ are determined according to the following equations:

$$Y_r'' = Y_{LW}(1-\text{sat}(Y,Y_{LW})) + Y_{CW}*\text{sat}(Y,Y_{LW}) \quad [6]$$

$$\text{sat}(Y,Y_{LW}) = 1.0 - (Y/Y_{LW}) \quad [7]$$

$$X_r' = X_{LW}(1-\text{sat}(C,C_{LW})) + X_{CW}*\text{sat}(C,C_{LW})) \quad [8]$$

$$Y_r' = Y_{LW}(1-\text{sat}(C,C_{LW})) + Y_{CW}*\text{sat}(C,C_{LW})) \quad [9]$$

$$Z_r' = Z_{LW}(1-\text{sat}(C,C_{LW})) + Z_{CW}*\text{sat}(C,C_{LW})) \quad [10]$$

$$\text{sat}(C,C_{LW}) = (\text{dev}X'Y'Z'/\text{maxDev})^\gamma \quad [11]$$

$$\text{maxDev} = \sqrt{6.0/9.0} \times \max(X', Y', Z') \quad [12]$$

$$\text{dev}X'Y'Z' = \sqrt{(X'-\text{avg}X'Y'Z')^2 + (Y'-\text{avg}X'Y'Z')^2 + (Z'-\text{avg}X'Y'Z')^2} \quad [13]$$

$$\text{avg}X'Y'Z' = (X'+Y'+Z')/3.0 \quad [14]$$

where $X'=X/X_{LW}$, $Y'=Y/Y_{LW}$, and $Z'=Z/Z_{LW}$, the color vector is $C=(X,Y,Z)$ with X, Y, and Z being a set of color data from block 44. As indicated by block 50, the Y-reference $Y_r''$ and the white reference vector $(X_r', Y_r', Z_r')$ are output for further use.

As indicated by block 52, the white reference vector $(X_r', Y_r', Z_r')$ and Y-reference $Y_r''$ are used to determine the L*a*b* color space by converting the original color data from block 44 according to the following color appearance model equations:

$$L^* = 116 \times f(Y/Y_r'') - 16 \quad [15]$$

$$a^* = 500 \times [f(X/X_r') - f(Y/Y_r')] \quad [16]$$

$$b^* = 200 \times [f(Y/Y_r') - f(Z/Z_r')] \quad [17]$$

$$f(\omega) = (\omega)^{1/3} \quad \omega > 0.008856 \quad [4]$$

$$f(\omega) = 7.787(\omega) + 16/116 \quad \omega \leq 0.008856 \quad [5]$$

Applying equations [15]–[17] to the color data obtained for the color imaging system, in combination with determining the white reference vector $(X_r', Y_r', Z_r')$ and Y-reference $Y_r''$ as in equations [6]–[14], produces a set of L*a*b* color space data that characterizes the color response of the color imaging system. The L*a*b* color space data are stored in an array as indicated by block 54.

The lightness value L* depends on the Y values of the color data in block 44 and of the local white point and common white point. Equations [6]–[7] and [15] indicate that as the value of Y in the original color data from block 44 increases, corresponding to a lighter color, the Y-reference $Y_r''$ approaches the Y value for local white. As the value of Y decreases, corresponding to a darker color, the Y-reference $Y_r''$ approaches the Y value for common white. Thus, the higher the Y value in the set of original color data from block 44, the more the lightness value L* depends on the local white point as a reference white point and the lower the Y value, the more the L* value depends on the common white point as a reference white point.

The redness-greenness value a* and the yellowness-blueness value b* depend on the X, Y, and Z values of the original color data in block 44 and of the local white point and common white point. Equations [8]–[14] and [16]–[17] indicate that as the color indicated by a set of original color data X,Y,Z, approaches a neutral color, the white reference vector $(X_r', Y_r', Z_r')$ approaches the local white point $C_{LW}$. As the color indicated by the set of color data deviates from a neutral color, the white reference vector $(X_r', Y_r', Z_r')$ approaches the common white point $C_{CW}$. Thus, the more neutral the color indicated by the set of original color data from block 44, the more the redness-greenness value a* and the yellowness-blueness b* value depend on the local white point as a reference white point and the more saturated the color, the more the a* and b* values depend on the common white point as a reference white point.

Figure 4:
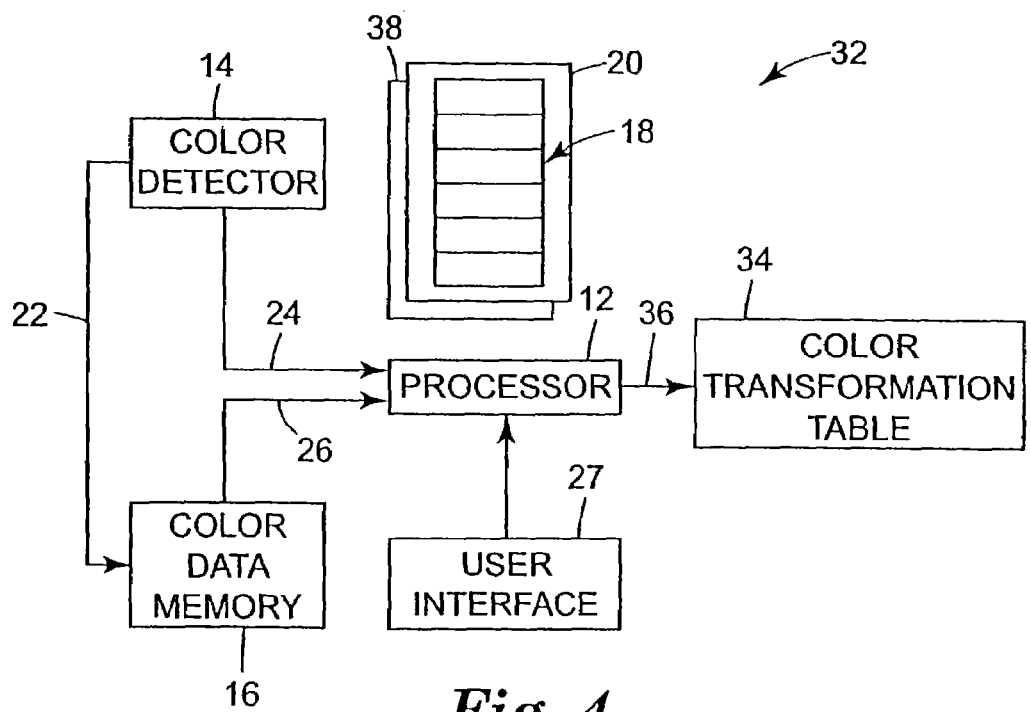
FIG. 4 is a block diagram of a system, in accordance with the invention, for performing a color transformation.

As shown in FIG. 4, a system 32 for performing a color transformation includes a processor 12, a color detector 14, a color data memory 16, a first substrate 20, a second substrate 38, and a stored color transformation table 34. The components of system 32 substantially correspond to system 10 of FIG. 1, with similar features having identical reference numbers. System 32 performs similar functions to those of system 10 to characterize two or more different color imaging systems. System 32 calculates a mapping between the color imaging systems based on the characterizations. The mapping is used to generate the color transformation table 34, which is stored in memory by the processor 12 as indicated by line 36. The color transformation table 34 is used to produce a color on a target color imaging system that visually matches the color produced by a source color imaging system.

The color detector 14 is configured to obtain color data representing the output of two or more color imaging systems. As shown in FIG. 4, color detector 14 is configured to detect color data from color patches 18 formed on the first printing substrate 20 by, or provided to, a first color imaging system and color patches (not shown) formed on the second printing substrate 38 by, or provided to, a second color imaging system. Alternatively, detector 14 can be configured to measure color values produced by various emissive or projecting devices, such as by phosphor screens or liquid crystal matrices. The detector 14 can send the detected color data to the color data memory 16 along line 22 for storage or to the processor 12 along line 24 for storage or processing.

The color data memory 16 stores color data in one or more color data files. The color data can be received from the detector 14 or from another source. The color data memory 16 can transmit stored color data to the processor 12 along line 26.

The processor 12 is configured to receive color data from the detector 14 and/or the memory 16 and to process the received data to perform a color transformation. The color data detected by the detector 14 and/or stored in color data memory 16 preferably represents CIE XYZ tristimulus values for each of a variety of color outputs generated by the different color imaging systems. To perform a color transformation, processor 12 can convert the color data obtained for each of the different color imaging systems using the L*a*b* color appearance model. The processor 12 can convert original color data obtained for the first and second color imaging systems into L*a*b* data. The conversion uses white reference vectors and Y-reference values that vary between local white and common white values of each color imaging system. The Y-reference values and white reference vectors depend on the intensities and neutralities of the colors indicated by the original color data from each color imaging system.

Figure 5:
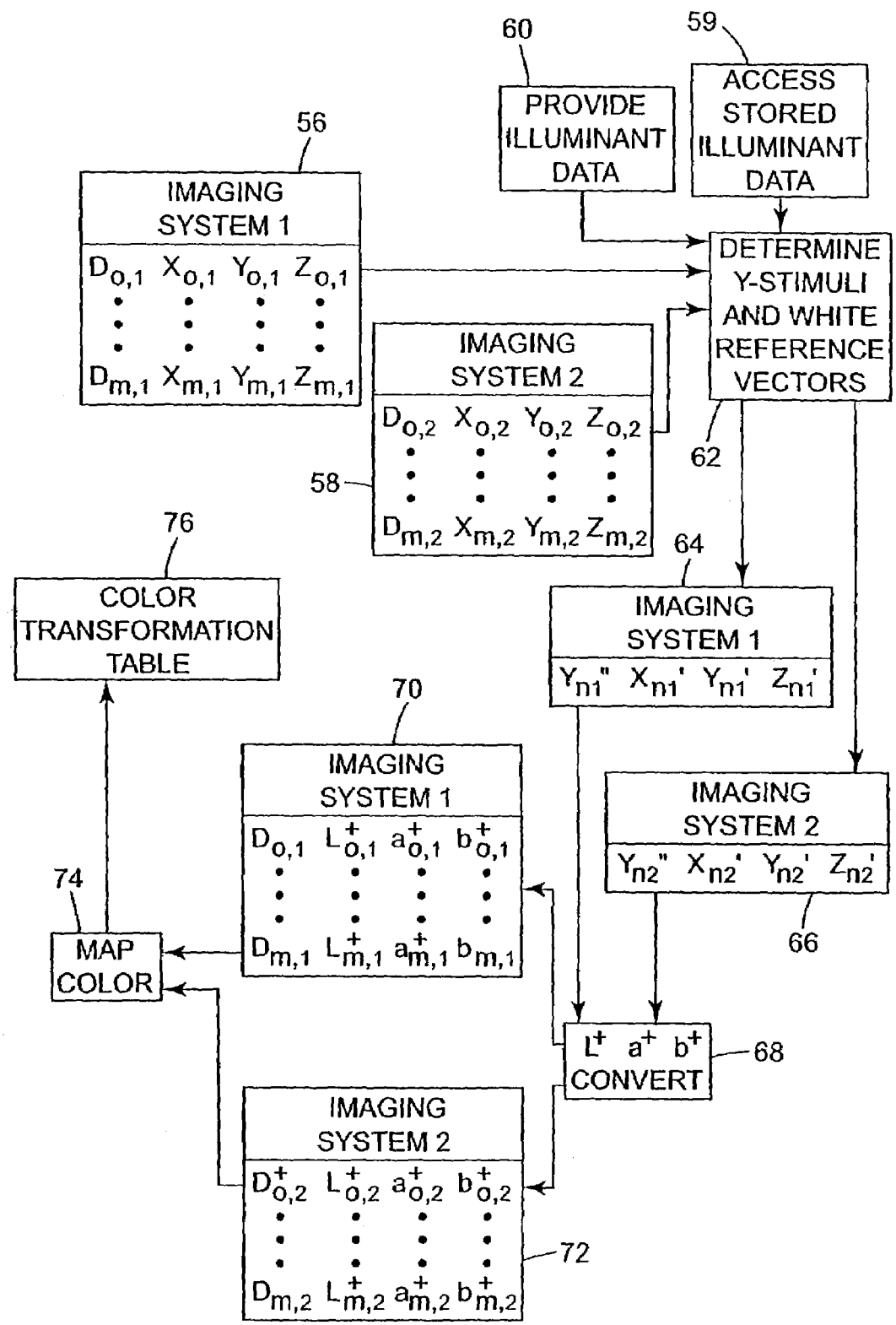
FIG. 5 is a functional block diagram of the system shown in FIG. 4.

FIG. 5 illustrates the functionality of system 32 and a method for performing a color transformation. Color data are obtained for a first, or source, color imaging system, as indicated by block 56, and for a second, or target, color imaging system, as indicated by block 58. The resulting color data for the first color imaging system comprises an array of CIE XYZ data $[(X_{0,1}, Y_{0,1}, Z_{0,1}) \ldots (X_{m,1}, Y_{m,1}, Z_{m,1})]$ whereas the color data for the second color imaging system comprises an array of CIE XYZ color data $[(X_{0,2}, Y_{0,2}, Z_{0,2}) \ldots (X_{m,2}, Y_{m,2}, Z_{m,2})]$. For example, the vector $(X_{0,1}, Y_{0,1}, Z_{0,1})$ represents the color data obtained for the media white point associated with the first, absorptive (e.g., CMYK), color imaging system, and the vector $(X_{0,2}, Y_{0,2}, Z_{0,2})$ represents the color data obtained for the media white point associated with the, absorptive, second color imaging system. Alternatively, these vectors can represent the media black points for emissive systems such as RGB systems. Similarly, the vector $(X_{m,1}, Y_{m,1}, Z_{m,1})$ represents the color data obtained for a maximum (minimum) intensity color produced by the first absorptive (emissive) color imaging system, and the vector $(X_{m,2}, Y_{m,2}, Z_{m,2})$ represents the color data obtained for a maximum (minimum) intensity color produced by the second absorptive (emissive) color imaging system. The value of $X_{m,1}$ is given by the value of $X_1$ which satisfies:

$$MAX(ABS(X_1 - X_b))$$

for all values of $X_1$ measured from all possible colors imaged by the first color imaging system, where ABS returns the absolute value of the difference value in parentheses, and MAX returns the maximum difference value for all values of $X_1$ relative to $X_b$. Values of $Y_{m,1}$, $Z_{m,2}$, $X_{m,2}$, $Y_{m,2}$, and $Z_{m,2}$ are similarly defined.

Local white points $C_{LW}$ and $C_{LW2}$ and the common white point $C_{CW}$ are obtained from the appropriate media and illuminant white points (TABLES 1–4). The media white points are obtained from the data in blocks 56 and 58 and the illuminant white point(s) is(are) obtained by accessing stored data (block 59) or by being provided (block 60) as appropriate. The illuminant white points correspond to, e.g., the illuminant under which colors were viewed to produce the data in blocks 56 and 58, or a predetermined white point.

As indicated by block 62, the color data in blocks 56 and 58 are used to determine white reference vectors $(X_{r1}', Y_{r1}', Z_{r1}')$ and $(X_{r2}', Y_{r2}', Z_{r2}')$ and Y-stimuli $Y_{r1}''$ and $Y_{r2}''$ in relation to local white points $C_{LW1}$ and $C_{LW2}$ and the common white point $C_{CW}$. These values are determined according to intensities and neutralities of colors indicated by the data in blocks 56 and 58 using the following equations:

$$Y_{r1}'' = Y_{LW1}(1 - sat(Y, Y_{LW1})) + Y_{CW} * sat(Y, Y_{LW1}) \quad [18]$$

$$sat(Y, Y_{LW1}) = 1.0 - (Y/Y_{LW1}) \quad [19]$$

$$X_{r1}' = X_{LW1}(1 - sat(C_1, C_{LW1})) + X_{CW} * sat(C_1, C_{LW1}) \quad [20]$$

$$Y_{r1}' = Y_{LW1}(1 - sat(C_1, C_{LW1})) + Y_{CW} * sat(C_1, C_{LW1}) \quad [21]$$

$$Z_{r1}' = Z_{LW1}(1 - sat(C_1, C_{LW1})) + Z_{CW} * sat(C_1, C_{LW1}) \quad [22]$$

$$sat(C_1, C_{LW1}) = (devX_1'Y_1'Z_1'/maxDev)^\gamma \quad [23]$$

$$maxDev = sqrt(6.0/9.0) \times max(X_1', Y_1', Z_1') \quad [24]$$

$$devX_1'Y_1'Z_1' = sqrt((X_1' - avgX_1'Y_1'Z_1')^2 + (Y_1' - avgX_1'Y_1'Z_1')^2 + (Z_1' - avgX_1'Y_1'Z_1')^2) \quad [25]$$

$$avgX_1'Y_1'Z_1' = (X_1' + Y_1' + Z_1')/3.0 \quad [26]$$

$$Y_{r2}'' = Y_{LW2}(1 - sat(Y, Y_{LW2})) + Y_{CW} * sat(Y, Y_{LW2}) \quad [27]$$

$$sat(Y, Y_{LW2}) = 1.0 - (Y/Y_{LW2}) \quad [28]$$

$$X_{r2}' = X_{LW2}(1 - sat(C_2, C_{LW2})) + X_{CW} * sat(C_2, C_{LW2}) \quad [29]$$

$$Y_{r2}' = Y_{LW2}(1 - sat(C_2, C_{LW2})) + Y_{CW} * sat(C_2, C_{LW2}) \quad [30]$$

$$Z_{r2}' = Z_{LW2}(1 - sat(C_2, C_{LW2})) + Z_{CW} * sat(C_2, C_{LW2}) \quad [31]$$

$$sat(C_2, C_{LW2}) = (devX_2'Y_2'Z_2'/maxDev)^\gamma \quad [32]$$

$$\text{maxDev}=\text{sqrt}(6.0/9.0)\times\max(X_2',Y_2',Z_2') \quad [33]$$

$$\text{dev}X_2'Y_2'Z_2'=\text{sqrt}((X_2'-\text{avg}X_2'Y_2'Z_2')^2+(Y_2'-\text{avg}X_2'Y_2'Z_2')^2+(Z_2'-\text{avg}X_2'Y_2'Z_2')^2) \quad [34]$$

$$\text{avg}X_2'Y_2'Z_2'=(X_2'+Y_2'+Z_2')/3.0 \quad [35]$$

where $X_1'=X_1/X_{LW1}$, $Y_1'=Y_1/Y_{LW1}$, and $Z_1'=Z_1/Z_{LW1}$, the color $C_1=(X_1,Y_1,Z_1)$ with $X_1$, $Y_1$, and $Z_1$ being a set of color data from block 56, and where $X_2'=X_2/X_{LW2}$, $Y_2'=Y_2/Y_{LW2}$, and $Z_2'=Z_2/Z_{LW2}$, the color vector $C_2=(X_2,Y_2,Z_2)$ with $X_2$, $Y_2$, and $Z_2$ being a set of color data from block 58. As indicated by blocks 64 and 66, the values for Y-stimuli $Y_{r1}''$ and $Y_{r2}''$ and for white reference vectors $(X_{r1}', Y_{r1}', Z_{r1}')$ and $(X_{r2}', Y_{r2}', Z_{r2}')$ are output for further use.

As indicated by block 68, the white reference vectors $(X_{r1}', Y_{r1}', Z_{r1}')$ and $(X_{r2}', Y_{r2}', Z_{r2}')$ and Y-stimuli $Y_{r1}''$ and $Y_{r2}''$ are used to determine the $L_1^*a_1^*b_1^*$ and $L_2^*a_2^*b_2^*$ color spaces by converting the original color data from blocks 56 and 58 according to the following color appearance model equations:

$$L_1^*=116\times f(Y_1/Y_{r1}'')-16 \quad [36]$$

$$a_1^*=500\times[f(X_1/X_{r1}')-f(Y_1/Y_{r1}')] \quad [37]$$

$$b_1^*=200\times[f(Y_1/Y_{r1}')-f(Z_1/Z_{r1}')] \quad [38]$$

$$L_2^*=116\times f(Y_2/Y_{r2}'')-16 \quad [39]$$

$$a_2^*=500\times[f(X_2/X_{r2}')-f(Y_2/Y_{r2}')] \quad [40]$$

$$b_2^*=200\times[f(Y_2/Y_{r2}')-f(Z_2/Z_{r2}')] \quad [41]$$

$$f(\omega)=(\omega)^{1/3} \quad \omega>0.008856 \quad [4]$$

$$f(\omega)=7.787(\omega)+16/116\omega \quad \omega\leq 0.008856 \quad [5]$$

Applying equations [36]–[41] to the color data obtained for the color imaging systems, in combination with determining the white reference vectors $(X_{r1}', Y_{r1}', Z_{r1}')$ and $(X_{r2}', Y_{r2}', Z_{r2}')$ and Y-stimuli $Y_{r1}''$ and $Y_{r2}''$ as in equations [18]–[35], produces sets of $L_1^*a_1^*b_1^*$ and $L_2^*a_2^*b_2^*$ color space data. These sets of data are subjected to multi-dimensional interpolation by the processor 12 to completely characterize the color responses of the color imaging systems. The complete sets of $L_1^*a_1^*b_1^*$ and $L_2^*a_2^*b_2^*$ color space data are stored in arrays as indicated by blocks 70 and 72 respectively.

The complete sets of $L_1^*a_1^*b_1^*$ and $L_2^*a_2^*b_2^*$ color space data are mapped to each other by the processor 12 as indicated by block 74. The processor 12 maps the color space data from the two color imaging systems to each other. This also maps the device stimulus data corresponding to the color space data for each color imaging system to each other. Thus, a mapping between device stimulus data (e.g., CMYK to C'M'Y'K' or RGB to CMYK) for the two color imaging systems is produced. Using this mapping, once the stimulus data associated with one color imaging system when producing, or measuring as the case may be, a color are known, the other system can be actuated with the mapped stimulus data to reproduce the color. The mapping is stored in a color transformation table as indicated by block 76.

Other embodiments are within the scope of the appended claims. For example, color data can be obtained in manners other than those described. Color appearance models that employ a luminance descriptor and descriptors for the relative amounts of red, green, yellow, and blue, other than those mentioned, can be used. Also, although the XYZ tristimulus values were described above as having, e.g., 256 discrete values (e.g., for a digital system), they may take on values for an analog system over a broad range of values to characterize, e.g., paint samples.

It has been found that calculating the white reference vector for dark colors based upon the angle from neutral may be helpful. Dark colors such as deep blue may have large chromas (e.g., about 60.0) but low values of XYZ and therefore devXYZ. This would result in the dark saturated colors being referenced to local white (or media white) rather than common white. Referencing these colors to common white, however, yields better color reproduction. It has been found to be helpful in accurately characterizing and reproducing colors to use a value for deviation from neutral that is based on the angle from neutral or on a sine or tangent of that angle, although the invention is not limited to these values of deviation from neutral. Appendix A provides an example, which in no way limits the scope of the invention or the appended claims, of C++ code utilizing the tangent of the angle from neutral. The code in Appendix A could be modified to use the angle, or the sine of the angle from neutral.

Other relationships, than provided above, between $L^*a^*b^*$ values and the local white point $C_{LW}$ and the common white point $C_{CW}$ are possible. The relationship between the white reference vector $(X_r', Y_r', Z_r')$ and the Y-reference and the local white point $C_{LW}$ and the common white point $C_{CW}$ was exemplary only and other relationships are possible. For example, the $L^*a^*b^*$ color space can be determined according to the following equations.

$$L^*=(1.0-\text{sat}\_L^*)\times L^*_{rel}+\text{sat}\_L^*\times L^*_{abs} \quad [42]$$

$$(a^*,b^*)=(1.0-\text{sat}\_a^*b^*)\times(a^*,b^*)_{rel}+\text{sat}\_a^*b^*\times(a^*,b^*)_{abs} \quad [43]$$

where $$\text{sat}\_L^*=1.0-(Y/Y_{LW}) \quad [44]$$

$$\text{sat}\_a^*b^*=C^*/L^* \quad [45]$$

$$C^*=\text{sqrt}(a^{*2}+b^{*2}) \quad [46]$$

Here the scaling from local white to common white is performed by linear addition of conventional absolute and relative CIELAB calculations given by equations [1]–[5]. Other relationships, such as nonlinear scaling, are possible.

Also, the Bradford chromatic adaptation transform can be modified to scale white points when using absolute white points instead of normalized white points such as for media-relative mapping of reflective prints. It is useful to think in terms of reference conditions (the destination conditions) and local conditions (the source conditions). For example, in the case of a reflection print, the white point for the reference conditions is usually the reference illuminant (e.g., D50), and the white point for the local condition is the media white.

First, the XYZ values are normalized using the luminance (Y) and the local black point $[X_{1k}, Y_{1k}, Z_{1k}]$ and then transformed through the Bradford matrix $M_b$ to obtain modified responses of the cones of the human eye:

$$\begin{bmatrix} R_1 \\ G_1 \\ B_1 \end{bmatrix} = M_b \begin{bmatrix} (X_1-X_{1k})/(Y_1-Y_{1k}) \\ (Y_1-Y_{1k})/(Y_1-Y_{1k}) \\ (Z_1-Z_{1k})/(Y_1-Y_{1k}) \end{bmatrix}$$

$$M_b = \begin{bmatrix} 0.8951 & 0.2664 & -0.1614 \\ -0.7502 & 1.7135 & 0.0367 \\ 0.0389 & -0.0685 & 1.0296 \end{bmatrix}$$

where $X_1$, $Y_1$, and $Z_1$ are the tristimulus values of a color to be transformed, and $R_1$, $G_1$, and $B_1$ are the modified responses of the cones of the human eye.

Second, the RGB signals are chromatically adapted from the local condition to the reference condition using the following equations (assuming complete adaptation):

$$R_{ref} = (R_{rw}/R_{1w}) \times R_1$$

$$G_{ref} = (G_{rw}/G_{1w}) \times G_1$$

$$B_{ref} = \text{Sign}[B_1] \times (B_{rw}/B_{1w}{}^\beta) \times |B_1|^\beta$$

$$\beta = (B_{1w}/B_{rw})^{0.0834}$$

where $R_{rw}$, $G_{rw}$, and $B_{rw}$ are the reference white RGB values, $R_{1w}$, $G_{1w}$, and $B_{1w}$ are the local white RGB values.

Third, the adapted RGB signals are transformed back to XYZ:

$$\begin{bmatrix} X_{ref} \\ Y_{ref} \\ Z_{ref} \end{bmatrix} = M_b^{-1} \begin{bmatrix} R_{ref} \times Y_1 \times Y_{rw}/(Y_{1w} - Y_{1k}) \\ G_{ref} \times Y_1 \times Y_{rw}/(Y_{1w} - Y_{1k}) \\ B_{ref} \times Y_1 \times Y_{rw}/(Y_{1w} - Y_{1k}) \end{bmatrix}$$

where $Y_{rw}$ is the reference white luminance value.

This adaptation to the reference condition takes into account any differences between the absolute level of the reference and local white luminance, in addition to factoring in the local black point. By scaling the Y values based on the difference between local and reference conditions, this adaptation method can be used for media-relative proofing to map between reflection prints. In this application, it is undesirable to simulate the absolute white point by printing color in the background area of the proof.

In addition, the local white to local black (neutral) axis is mapped to the neutral axis of the reference condition, while larger adaptations are applied to colors that are further away from the local neutral axis. In this context, this can be viewed as an alternative approach to the variable white reference concepts discussed above.

The XYZ values that have been adapted to the reference conditions are used to compute L*a*b* values:

$$L^* = 116 \times f(Y/Y_n) - 16$$

$$a^* = 500 \times [f(X/X_n) - f(Y/Y_n)]$$

$$b^* = 200 \times [f(Y/Y_n) - f(Z/Z_n)]$$

$$f(\omega) = (\omega)^{1/3} \quad \omega > 0.008856$$

$$f(\omega) = 7.787(\omega) + 16/116 \quad \omega \leq 0.008856$$

Figure 6:
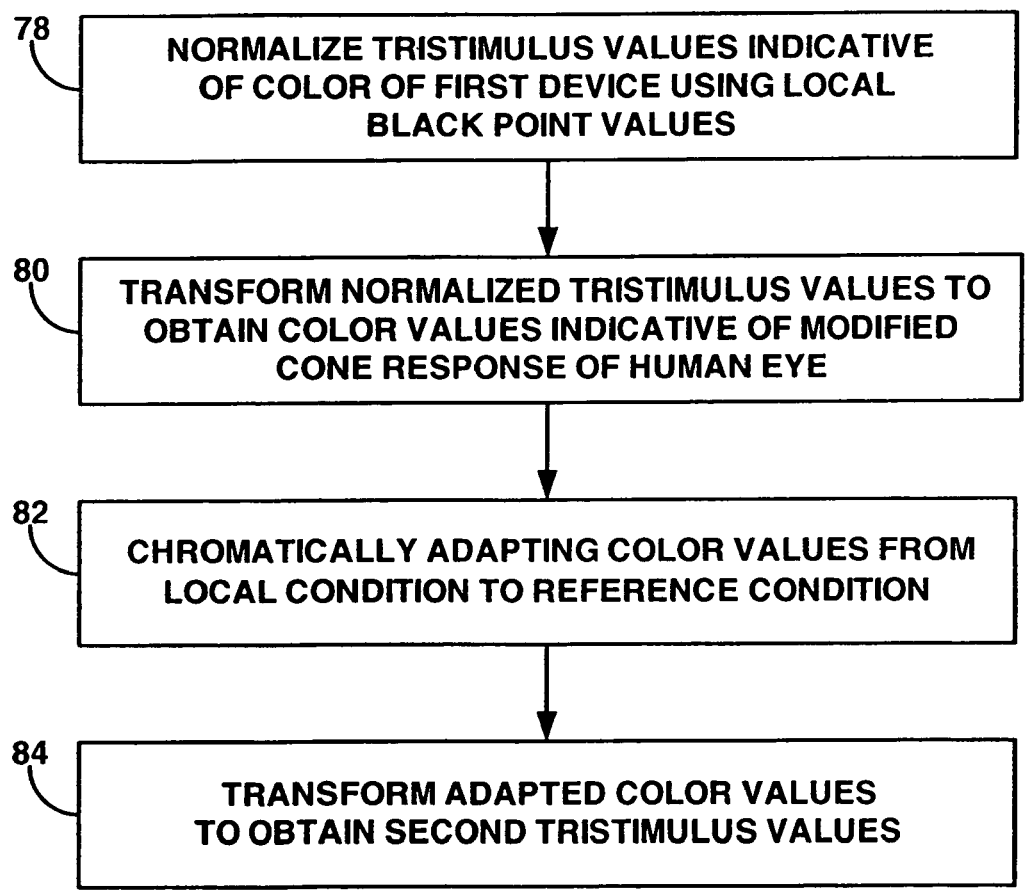
FIG. 6 is a flow diagram illustrating a method for characterizing colors for reproduction between a first device and a second device.

FIG. 6 is a flow diagram illustrating a method for characterizing colors for reproduction between a first device and a second device, as described above. As shown in FIG. 6, the method includes normalizing first tristimulus values indicative of a color of the first device using local black point values (78), transforming the normalized first tristimulus values to obtain color values indicative of modified cone response of the human eye (80), chromatically adapting the color values from a local condition to a reference condition (82), and transforming the adapted color values to obtain second tristimulus values (84).

This chromatic adaptation formulation can use color spaces other than the standard L*a*b* color space. This formulation can just as easily be used with alternative color spaces such as the ones from CIECAM-97s, LLab, or RLab. By utilizing the same XYZ to "uniform color space" transformation for all components of a given matching step, however, different adaptation methods can be applied to achieve useful results, as discussed below.

The concepts described can be applied to chromatic adaptation methods other than the Bradford adaptation, such as the von Kries transform. Thus:

$$\begin{bmatrix} X_{ref} \\ Y_{ref} \\ Z_{ref} \end{bmatrix} = M_v^{-1} \begin{bmatrix} L_{rw} & 0 & 0 \\ 0 & M_{rw} & 0 \\ 0 & 0 & S_{rw} \end{bmatrix}$$

$$\begin{bmatrix} 1/(L_{1w} - L_{1k}) & 0 & 0 \\ 0 & 1/(M_{1w} - M_{1k}) & 0 \\ 0 & 0 & 1/(S_{1w} - S_{1k}) \end{bmatrix} M_v \begin{bmatrix} X_1 \\ Y_1 \\ Z_1 \end{bmatrix}$$

$$M_v = \begin{bmatrix} 0.38791 & 0.68898 & -0.07868 \\ -0.22981 & 1.18340 & 0.04641 \\ 0 & 0 & 1.0 \end{bmatrix}$$

where $[L_{rw}, M_{rw}, S_{rw}]$ are the LMS (long, medium, and short wavelength band) values of the reference white, $[L_{1w}, M_{1w}, S_{1w}]$ are the LMS values for local white, and $[L_{1k}, M_{1k}, S_{1k}]$ are the LMS values for the local black. The resulting adapted XYZ value is used as the starting point for computing the L*a*b* value using the XYZ to Lab equations described above.

These modified Bradford and von Kries adaptations can be applied differently than conventionally thought. These adaptations can be used in conjunction with standardized CIE-Lab (e.g., Hunt, LLab, RLab, CIE-CAM97) calculations and can be applied to different types of media (e.g., CRT, reflection print) when performing cross-media rendering. To perform such rendering, colors from each media are converted using a modified transform, including reference and local XYZ and/or LMS values, and a desired color space so that the converted colors can be mapped. The following are three specific examples of ways in which these methods can be applied:

1. Matching print to print using media-relative colorimetry:

$XYZ_{rw}$ is the XYZ of the reference illuminant for both print devices, assuming a common illuminant.

$XYZ_{1w}$ for each of the prints is the actual XYZ of the media white of the respective print.

Bradford-type adaptation is used for both prints.

In this case, the illuminant white will be common for the two prints and will reflect the desired viewing environment (e.g., a D50 light booth). White on the first print will map to white on the second print, and differences in the background paper color will be taken into account in generating the match for chromatic colors.

2. Matching print to display using media-relative calorimetry:

$XYZ_{rw}$ is the XYZ of the reference illuminant.

$XYZ_{1w}$ for the print is the actual XYZ of the media white of the print.

$XYZ_{1w}$ for the display is the actual XYZ of the monitor white point of the display.

Bradford-type adaptation is used for both the print and the monitor.

In this case, the monitor colors will be chromatically adapted to the reference illuminant so as to give a good perceptual match. By scaling the luminance in the Bradford equations to account for differences between the Y of the media white and the Y of the illuminant white, the white point of the print will map to the white point of the monitor.

3. Matching print to display using absolute calorimetry:

$XYZ_{rw}$ is the XYZ of the reference illuminant.

$XYZ_{1w}$ for the print is the actual XYZ of the media white of the print.

$XYZ_{1w}$ for the display is the actual XYZ of the monitor white point of the display.

Bradford-type adaptation is used for the monitor.

Absolute CIE-Lab is used for the print.

By performing matching in this way, instead of the standard approach to this situation of using absolute calorimetry for both the monitor and the print, the Bradford-type adaptation performed on the monitor values simulates the chromatic adaptation occurring in the eye. Absolute colorimetry, performing no chromatic adaptation, can be used on the print while performing the chromatic adaptation on the monitor to achieve a good perceptual match. This approach could be applied using a different conversion between XYZ values and the matching color metric (e.g., L*a*b*, LLab, RLab, CIECAM-97s).

While the descriptions of these three exemplary applications assume no black point mapping, So $XYZ_{1k}=(0,0,0)$, for all of these applications media black point mapping can be applied. Media black point mapping is described in patent application Ser. No. 08/884,411 filed Jun. 27, 1997, entitled "Characterization of Color Imaging Systems," assigned to the assignee of this application, and incorporated herein by reference.

TABLE 1

Reference White Points for Two Absorptive Devices Using One Illuminant

|  | Relative Colorimetry | Absolute Colorimetry |
|---|---|---|
| Local White Point | media white | illuminant white |
| Common White Point | illuminant white | illuminant white |

TABLE 2

Reference White Points for Two Absorptive Devices Using Different Illuminants

|  | Relative Color | Absolute Colorimetry |
|---|---|---|
| Local White Point | media white | illuminant white (for each device) |
| Common White Point | illuminant white | illuminant white |

TABLE 3

Reference White Points for One Absorptive Device and One Emissive Device

|  | Relative Colorimetry | Absolute Colorimetry |
|---|---|---|
| Local White Point | media white | media white (emissive) illuminant white (absorptive) |
| Common White Point | illuminant white | illuminant white |

TABLE 4

Reference White Points for Two Emissive Devices

|  | Relative Colorimetry | Absolute Colorimetry |
|---|---|---|
| Local White Point | media white | media white (for each device) |
| Common White Point | illuminant white | illuminant white |

APPENDIX A

```
static const double    kOneThird =      (1.0 / 3.0);
static const double    kLabExp =        2.8;
static const double    kChromaPower =   1.5;
static const double    kWhiteRefCoeff = 2.5;
static const double    kLabThresh =     (0.00885600);
static const double    kLabCbrtThresh = pow (kLabThresh,
    kOneThird);
static const double kBlackPtScale = -0.0;
#define LabGammaThresh(gamma) pow(kLabThresh, gamma)
#define min2__(x,y)         (x>y ? y : x)
#define max2__(x,y)         (x>y ? x : y)
#define min3__(x,y,z)       (min2__(x,y)> z? z : min2__(x,y))
#define max3__(x,y,z)       max2__(0.0001, (max2__(x,y)> z?
    max2__(x,y) : z))
void CalcLABPLUS (    double X,double Y, double Z,
                      double Xm,double Ym, double Zm,
                      double Xn,double Yn, double Zn,
                      double *L_star, double *a_star, double
                      *b_star)
{
double X,Y,Z,Xm,Ym,Zm,Xn,Yn,YnL,Zn,Xr,Yr,Zr,cbrtY;
double ratX, ratY, ratZ;
double POWER_XYZ = 1.0/kLabExp;
static const double LAB_THRESH = ( (double) 0.00885600);
static const double LAB_CONST = ( (double) 0.13793103);
double Lscale = (116.0*pow(LAB_THRESH,POWER_XYZ) -
    16.0) /LAB_THRESH;
double XYZscale = (pow(LAB_THRESH,POWER_XYZ) -
    LAB_CONST) /LAB_THRESH;
double    deltaWhitePtX = Xm - Xn;
double    deltaWhitePtY = Ym - Yn;
double    deltaWhitePtZ = Zm - Zn;
double Xnorm = X/Xm;
double Ynorm = Y/Ym;
double Znorm = Z/Zm;
double XYZlength =
    sqrt (Xnorm*Xnorm+Ynorm*Ynorm+Znorm*Znorm);
double XYZDiagProjection = (Xnorm+Ynorm+Znorm) /sqrt(3.0);
double devXYZ = sqrt(XYZlength*XYZlength-
    XYZDiagProjection*XYZDiagProjection);
double maxDev = 2.0 * sqrt (3.0) /3.0;
devTangentXYZ = devXYZ/XYZDiagProjection;
whiteRefCorr = kWhiteRefCoeff *
    pow (devTangentXYZ/maxDev, kChromaPower);
double XAdj -= X - Xnorm * deltaWhitePtX * (1.0 - devXYZ);
double YAdj -= Y - Ynorm * deltaWhitePtY * (1.0 - devXYZ);
double ZAdj -= Z - Znorm * deltaWhitePtZ * (1.0 - devXYZ);
doubleXbm = Xm * kBlackPtScale;
doubleYbm = Ym * kBlackPtScale;
doubleZbm = Zm * kBlackPtScale;
Xn = (X/ XAdj) * Xn;
Yn = (Y/ YAdj) * Yn;
Zn = (Z/ ZAdj) * Zn;
Xr = X/Xn;
Yr = Y/ Yn;
Zr = Z/Zn;
cbrtY = pow(Yr, POWER_XYZ);
116.0*cbrtY - 16.0 : 903.3*Yr);
cbrtY = pow(Yr, POWER_XYZ);
cbrtY = (Yr > LAB_THRESH) ? cbrtY : XYZscale*Yr + LAB_CONST;
*a_star = 500.0 * ( ( (Xr > LAB_THRESH) ? pow(Xr, POWER_XYZ) :
    XYZscale*Xr + LAB_CONST) - cbrtY);
*b_star = 200.0 * (cbrtY - ( (Zr > LAB_THRESH) ? pow(Zr,
    POWER_XYZ) : XYZscale*Zr + LAB_CONST));
Yr = Y/ Ym;
```

APPENDIX A-continued

```
cbrtY = pow(Yr, POWER_XYZ);
*L__Star =( (Yr>LAB_THRESH) ?116.0*cbrtY-16.0: Lscale*Yr);
return;
}
```

What is claimed is:

1. A method of characterizing colors for reproduction between a first device and a second device, the method comprising:
   normalizing first tristimulus values indicative of a color of the first device using local black point values;
   transforming the normalized first tristimulus values to obtain color values indicative of modified cone response of the human eye;
   chromatically adapting the color values from a local condition to a reference condition; and
   transforming the adapted color values to obtain second tristimulus values.

2. The method of claim 1 wherein a neutral axis of the local condition is mapped to a neutral axis of the reference condition.

3. The method of claim 1 wherein normalizing the first tristimulus values includes dividing by a difference between a local luminance value and a local black point luminance value.

4. The method of claim 3 wherein transforming the adapted color values includes multiplying the adapted color values by a reference white point luminance value divided by a difference between a local white point luminance value and the local black point luminance value.

5. The method of claim 1 wherein transforming the normalized first tristimulus values is performed using a Bradford transformation.

6. The method of claim 5 wherein normalizing the first tristimulus values and transforming the normalized first tristimulus values are performed according to $$\begin{bmatrix} R_1 \\ G_1 \\ B_1 \end{bmatrix} = M_b \begin{bmatrix} (X_1 - X_{1k})/(Y_1 - Y_{1k}) \\ (Y_1 - Y_{1k})/(Y_1 - Y_{1k}) \\ (Z_1 - Z_{1k})/(Y_1 - Y_{1k}) \end{bmatrix}$$

where $[X_{1K}, Y_{1K}, Z_{1K}]$ is the local black point, $X_1$, $Y_1$, and $Z_1$, are the first tristimulus values, $$M_b = \begin{bmatrix} 0.8951 & 0.2664 & -0.1614 \\ -0.7502 & 1.7135 & 0.0367 \\ 0.0389 & -0.0685 & 1.0296 \end{bmatrix}$$

where $R_1$, $G_1$, and $B_1$ are the color values indicative of modified cone responses of the human eye and $M_b$ is a Bradford matrix.

7. The method of claim 6 wherein chromatically adapting the color values is performed according to $$R_{ref}=(R_{rw}/R_{1w}) \times R_1$$

$$G_{ref}=(G_{rw}/G_{1w}) \times G_1$$

$$B_{ref}=\text{Sign}(B_1) \times (B_{rw}/B_{1w}{}^\beta) \times |B_1|^\beta$$

$$\beta=(B_{1w}/B_{rw})^{0.0836}$$

where $R_{rw}$, $G_{rw}$ and $B_{rw}$ and RGB values of a reference white point, $R_{1w}$, $G_{1w}$, and $B_{1w}$ are RGB values of a local white point, β is an adjustment factor, and $R_{ref}$, $G_{ref}$, and $B_{ref}$ are cone responses adapted from local to reference values.

8. The method of claim 7 wherein transforming the adapted color values to second tristimulus values is performed according to $$\begin{bmatrix} X_{ref} \\ Y_{ref} \\ Z_{ref} \end{bmatrix} = M_y^{-1} \begin{bmatrix} R_{ref} \times Y_1 \times Y_{rw}/(Y_{1w} - Y_{1k}) \\ G_{ref} \times Y_1 \times Y_{rw}/(Y_{1w} - Y_{1k}) \\ B_{ref} \times Y_1 \times Y_{rw}/(Y_{1w} - Y_{1k}) \end{bmatrix}$$

where $X_{ref}$, $Y_{ref}$, and $Z_{ref}$ are the second tristimulus values.

9. The method of claim 1 wherein transforming the normalized first tristimulus values is performed using a von Kries transformation.

10. The method of claim 9 wherein $$\begin{bmatrix} X_{ref} \\ Y_{ref} \\ Z_{ref} \end{bmatrix} = M_y^{-1} \begin{bmatrix} L_{rw} & 0 & 0 \\ 0 & M_{rw} & 0 \\ 0 & 0 & S_{rw} \end{bmatrix}$$

$$\begin{bmatrix} 1/(L_{1w} - L_{1k}) & 0 & 0 \\ 0 & 1/(M_{1w} - M_{1k}) & 0 \\ 0 & 0 & 1/(S_{1w} - S_{1k}) \end{bmatrix} M_y \begin{bmatrix} X_1 \\ Y_1 \\ Z_1 \end{bmatrix}$$

where $$M_y = \begin{bmatrix} 0.38791 & 0.68898 & -0.07868 \\ -0.22981 & 1.18340 & 0.04641 \\ 0 & 0 & 1.0 \end{bmatrix}$$

and where $(L_{rw}, M_{rw}, S_{rw})$ are LMS (long, medium, and short wavelength band) values for local white, $(L_{1k}, M_{1k}, S_{1k})$ are LMS values for local black $X_1$, $Y_1$, and $Z_1$ are the first tristimulus values, and $X_{ref}$, $Y_{ref}$, and $Z_{ref}$ are the second tristimulus values.

11. The method of claim 1, wherein the first device is a print device and the second device is a print device, tristimulus values of a common illuminant are used as reference tristimulus white values for the print devices, media white tristimulus values of each of the print devices are used as local tristimulus white values for the print devices, and Bradford-type adaptations are used for the print devices to implement media-relative colorimetry.

12. The method of claim 1 wherein the first device is a print device and the second device is a display device, tristimulus values of a reference illuminant are used as reference tristimulus white values, media white tristimulus values of the print device are used as local tristimulus white values for the print device, monitor white tristimulus values of the display devices, and Bradford-type adaptations are used for the first and second devices to implement media-relative colorimetry.

13. The method of claim 1 wherein the first device is a print device and the second device is a display device, tristimulus values of a reference illuminant are used as reference tristimulus white values for the display device, media white tristimulus values of the print device are used as local tristimulus white values, monitor white tristimulus values of the display device are used as local tristimulus values for the display device, Bradford-type adaptation is used for the display device, and absolute CIE-Lab is used for the print device to implement absolute colorimetry.

14. A computer-readable medium comprising instructions for characterization of colors for reproduction between a first device and a second device, the instructions causing a processor to:
  normalize first tristimulus values indicative of a color of the first device using local black point values;
  transform the normalized first tristimulus values to obtain color values indicative of modified cone response of the human eye;
  chromatically adapt the color values from a local condition to a reference condition; and
  transform the adapted color values to obtain second tristimulus values.

15. The computer-readable medium of claim 14 wherein the instructions cause the processor to normalize the first tristimulus values by dividing by a difference between a local luminance value and a local black point luminance values,
  wherein the instructions cause the processor to transform the adapted color values by multiplying the adapted color values by a reference white point luminance value divided by a difference between a local white point luminance value and the local black point luminance value, and wherein the instructions cause the processor to transform the normalized first tristimulus values using a Bradford transformation, and
  wherein the instructions cause the processor to normalize the first tristimulus values and transform the normalized first tristimulus values according to:

$$\begin{bmatrix} R_1 \\ G_1 \\ B_1 \end{bmatrix} = M_b \begin{bmatrix} (X_1 - X_{1K})/(Y_1 - Y_{1K}) \\ (Y_1 - Y_{1K})/(Y_1 - Y_{1K}) \\ (Z_1 - Z_{1K})/(Y_1 - Y_{1K}) \end{bmatrix}$$

where $[X_{1K}, Y_{1K}, Z_{1K}]$ is the local black point, $X_1, Y_1,$ and $Z_1$ are the first tristimulus values, $$M_b = \begin{bmatrix} 0.8951 & 0.2664 & -0.1614 \\ -0.7502 & 1.7135 & -0.0367 \\ 0.0389 & -0.0685 & 1.0296 \end{bmatrix}$$

and
  where $R_1, G_1,$ and $B_1$ are the color values indicative of modified cone responses of the human eye and $M_b$ is a Bradford matrix.

16. The computer-readable medium of claim 15, wherein the instructions cause the processor to chromatically adapt the color values according to:

$R_{ref} = (R_{rw}/R_{1w}) \times R_1$ $G_{ref} = (G_{rw}/G_{1w}) \times G_1$ $B_{ref} = \text{Sign}(B_1) \times (B_{rw}/B_{1w}^\beta) \times |B_1|^\beta$ $\beta = (B_{1w}/B_{rw})^{0.0836}$ where $R_{rw}, G_{rw}$ and $B_{rw}$ and RGB values of a reference white point, $R_{1w}, G_{1w},$ and $B_{1w}$ are RGB values of a local white point, $\beta$ is an adjustment factor, and $R_{ref}, G_{ref},$ and $B_{ref}$ are cone responses adapted from local to reference values and
  wherein the instructions cause the processor to transform the adapted color values to second tristimulus values is performed according to:

$$\begin{bmatrix} X_{ref} \\ Y_{ref} \\ Z_{ref} \end{bmatrix} = M_y^{-1} \begin{bmatrix} R_{ref} \times Y_1 \times Y_{rw}/(Y_{1w} - Y_{1k}) \\ G_{ref} \times Y_1 \times Y_{rw}/(Y_{1w} - Y_{1k}) \\ B_{ref} \times Y_1 \times Y_{rw}/(Y_{1w} - Y_{1k}) \end{bmatrix}$$

where $X_{ref}, Y_{ref},$ and $Z_{ref}$ are the second tristimulus and $M_y$ is a von Kries matrix.

17. The computer-readable medium of claim 14, wherein the instructions cause the processor to transform the normalized first tristimulus values using a von Kries transformation, wherein $$\begin{bmatrix} X_{ref} \\ Y_{ref} \\ Z_{ref} \end{bmatrix} = M_y^{-1}$$

$$\begin{bmatrix} L_{rw} & 0 & 0 \\ 0 & M_{rw} & 0 \\ 0 & 0 & S_{rw} \end{bmatrix} \begin{bmatrix} 1/(L_{1w} - L_{1k}) & 0 & X_1 \\ 0 & 1/(M_{1w} - M_{1k}) & 0 \\ 0 & 0 & 1/(S_{1w} - S_{1k}) \end{bmatrix} M_y \begin{bmatrix} X_1 \\ Y_1 \\ Z_1 \end{bmatrix}$$

where $$M_y = \begin{bmatrix} 0.38791 & 0.68898 & -0.07868 \\ -0.22981 & 1.18340 & 0.04641 \\ 0 & 0 & 1.0 \end{bmatrix}$$

and where $(L_{ref}, M_{ref}, S_{rw})$ are LMS (long, medium, and short wavelength band) values for local white, $(L_{1k}, M_{1k}, S_{1k})$ are LMS values for local black $X_1, Y_1,$ and $Z_1$ are the first tristimulus values, and $X_{ref}, Y_{ref},$ and $Z_{ref}$ are the second tristimulus values and $M_y$ is a von Kries matrix.

18. The computer-readable medium of claim 14, wherein the first-device is a print device and the second device is a print device, tristimulus values of a common illuminant are used as reference tristimulus white values for the print devices, media white tristimulus values of each print device are used as local tristimulus white values for the print devices, and Bradford-type adaptations are used for both print devices to implement media-relative colorimetry.

19. The computer-readable medium of claim 14, wherein the first device is a print device and the second device is a display device, tristimulus values of a reference illuminant are used as reference tristimulus white values, media white tristimulus values of the print device are used as local tristimulus white values for the print device, monitor white tristimulus values of the display device are used as local tristimulus values for the display device, and Bradford-type adaptations are used for the devices to implement media-relative colorimetry.

20. The computer-readable medium of claim 14, wherein the first-device is a print device and the second device is a display device, tristimulus values of a reference illuminant are used as reference tristimulus white values for the display device, media white tristimulus values of the print device are used as local tristimulus white values, monitor white tristimulus values of the display device are used as local tristimulus values for the display device, Bradford-type adaptation is used for the display device, and absolute CIE-Lab is used for the print device to implement absolute calorimetry.

* * * * *

UNITED STATES PATENT AND TRADEMARK OFFICE
CERTIFICATE OF CORRECTION

PATENT NO. : 7,120,295 B2
APPLICATION NO. : 10/612734
DATED : October 10, 2006
INVENTOR(S) : Christopher J. Edge et al.

It is certified that error appears in the above-identified patent and that said Letters Patent is hereby corrected as shown below:

| | |
|---|---|
| Column 18, line 12 | In equation: "= $M_y^{-1}$" should read as --= $M_v^{-1}$ -- |
| Column 18, line 24 | In equation: "= $M_y^{-1}$" should read as --= $M_v^{-1}$ -- |
| Column 18, line 27 | First line of the equation, delete the second occurance of "0" and insert --$X_1$-- |
| Column 18, line 35 | In equation: "$M_y$ =" should read as --$M_v$ =-- |
| Column 20, line 13 | In equation: "= $M_y^{-1}$" should read as --= $M_v^{-1}$ -- |
| Column 20, line 17 | "$M_y$" should read as --$M_v$-- |
| Column 20, line 26 | In equation: "= $M_y^{-1}$" should read as --= $M_v^{-1}$ -- |
| Column 20, line 30 | In equation: "$M_y$" should read as --$M_v$-- |
| Column 20, line 38 | In equation: "$M_y$=" should read as --$M_v$ =-- |
| Column 20, line 46 | "$M_y$" should read as --$M_v$-- |
| Column 22, line 3 | "calorimetry" should read as --colorimetry-- |

Signed and Sealed this

Third Day of April, 2007

JON W. DUDAS
*Director of the United States Patent and Trademark Office*